(12) United States Patent
Rogers

(10) Patent No.: US 8,177,304 B2
(45) Date of Patent: May 15, 2012

(54) SIDE DUMP BODY

(76) Inventor: Ralph R. Rogers, Dakota Dunes, SD (US)

( * ) Notice: Subject to any disclaimer, the term of this patent is extended or adjusted under 35 U.S.C. 154(b) by 42 days.

(21) Appl. No.: 12/925,457

(22) Filed: Oct. 21, 2010

(65) Prior Publication Data
US 2012/0070258 A1 Mar. 22, 2012

Related U.S. Application Data

(63) Continuation-in-part of application No. 12/924,154, filed on Sep. 22, 2010, now Pat. No. 8,087,731.

(51) Int. Cl.
B60P 1/16 (2006.01)
(52) U.S. Cl. .......................................................... 298/18
(58) Field of Classification Search ................ 298/17 R, 298/17.5, 17.6, 17.7, 18, 19 R, 22 R, 22 D
See application file for complete search history.

(56) References Cited

U.S. PATENT DOCUMENTS

| | | | |
|---|---|---|---|
| 5,480,214 A | 1/1996 | Rogers | |
| 5,845,971 A | 12/1998 | Rogers | |
| 5,906,417 A * | 5/1999 | Golden | 298/17.6 |
| 5,967,615 A | 10/1999 | Rogers | |
| 6,056,368 A | 5/2000 | Rogers | |
| 6,089,670 A | 7/2000 | Rogers | |
| 6,106,072 A * | 8/2000 | Lutter, Jr. | 298/17.7 |
| 6,179,385 B1 | 1/2001 | Rogers | |
| 6,199,955 B1 | 3/2001 | Rogers | |
| 6,257,670 B1 | 7/2001 | Rogers | |
| 6,402,453 B1 | 6/2002 | Rogers | |
| 6,425,726 B1 | 7/2002 | Rogers | |
| 6,428,264 B1 | 8/2002 | Rogers | |
| 6,520,589 B2 | 2/2003 | Jensen et al. | |
| 6,669,304 B2 * | 12/2003 | Binning | 298/17.7 |
| 6,905,175 B1 * | 6/2005 | Verros | 298/17.7 |
| 7,032,950 B2 * | 4/2006 | Eggers et al. | 296/98 |
| 7,360,843 B1 | 4/2008 | Rogers | |
| 7,478,883 B1 | 1/2009 | Rogers | |
| 7,611,187 B1 | 11/2009 | Rogers | |
| 7,722,126 B2 | 5/2010 | Rogers | |
| 7,789,467 B2 | 9/2010 | Rogers | |
| 7,819,486 B2 | 10/2010 | Rogers | |
| 7,841,668 B2 * | 11/2010 | Rogers et al. | 298/17.7 |
| 7,866,756 B2 * | 1/2011 | Rogers et al. | 298/17.7 |
| 7,942,480 B2 * | 5/2011 | Rogers | 298/18 |
| 7,992,942 B2 * | 8/2011 | Heider et al. | 298/18 |
| 8,087,731 B1 * | 1/2012 | Rogers | 298/18 |
| 2002/0145328 A1 * | 10/2002 | Jensen et al. | 298/18 |
| 2012/0007410 A1 * | 1/2012 | Rogers et al. | 298/17.6 |

* cited by examiner

Primary Examiner — H Gutman
(74) Attorney, Agent, or Firm — Dennis L. Thomte; Thomte Patent Law Office LLC

(57) ABSTRACT

A side dump body or trailer comprising a wheeled frame having one or more side dump bodies pivotally mounted thereon which may be individually moved from a transport position to a side dumping position at either side of the truck or trailer. Once the side dump body is in its dumping position, the side dump body may be moved somewhat upwardly and inwardly away from the pile of material which has been dumped at one side of the truck or trailer.

4 Claims, 9 Drawing Sheets

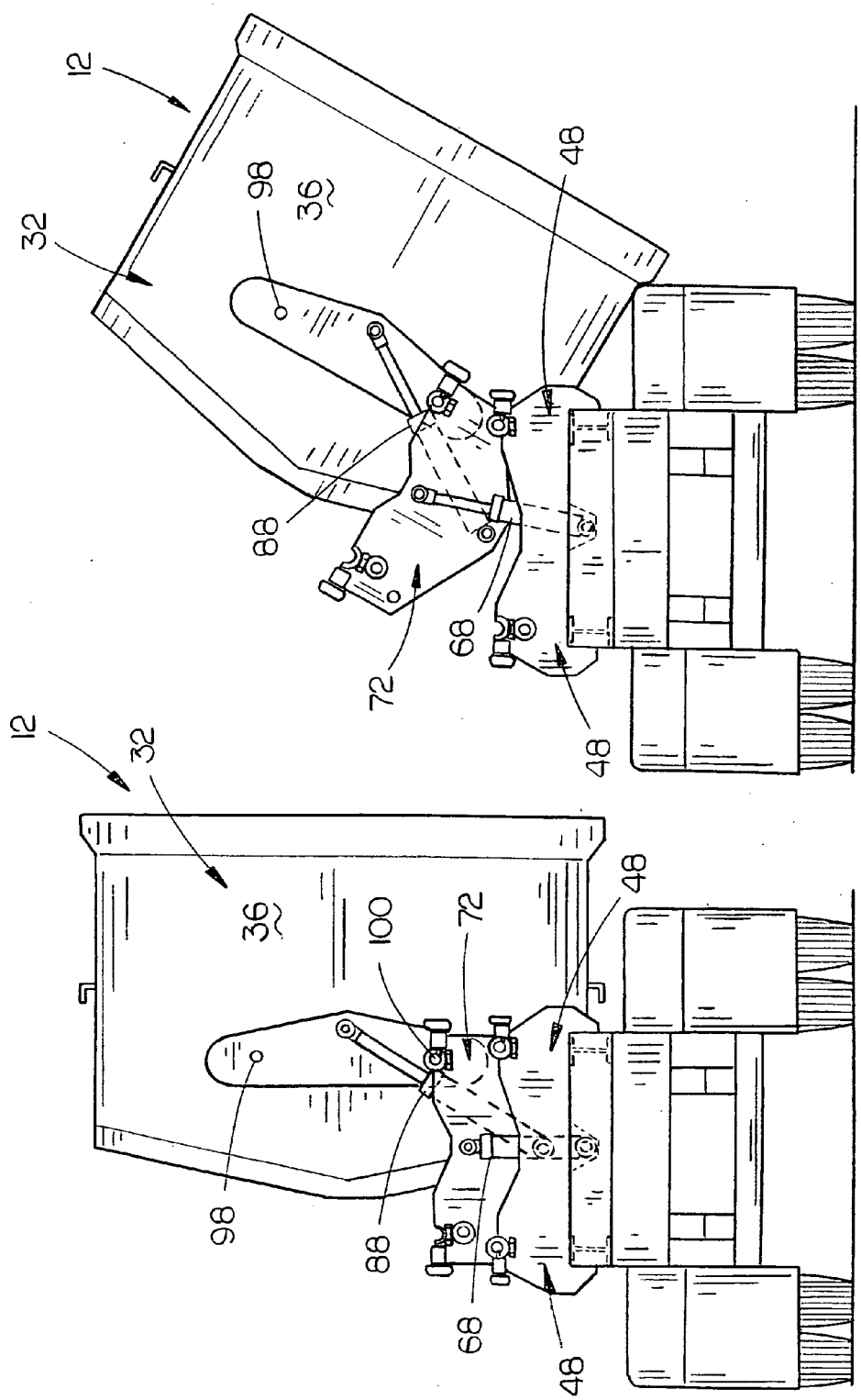

SIDE DUMP BODY

CROSS-REFERENCE TO RELATED APPLICATION

This application is a continuation-in-part application of Ser. No. 12/924,154, which was filed on Sep. 22, 2010 now U.S. Pat. No. 8,087,731.

BACKGROUND OF THE INVENTION

1. Field of the Invention

This invention relates to a side dump body and more particularly to a side dump body for use on a trailer or truck and which has increased carrying capacity when compared to conventional side dump trailers. More particularly, this invention relates to a side dump body wherein one or more of side dump bodies are mounted on a trailer or truck with each of the side dump bodies being selectively pivotally movable between a transport position and a dumping position at either side of the truck or trailer.

2. Description of the Related Art

Dump bodies which are employed on trailers or trucks normally are of the end dump type or the side dump type. Since the introduction of the side dump body disclosed in applicant's U.S. Pat. No. 5,480,214, side dump trucks and trailers have experienced wide acceptance. Perhaps the only drawback to applicant's earlier side dump body is that the body does not have as much carrying capacity as an end dump body due to the fact that the side walls of the side dump body extend upwardly and outwardly from a bottom wall, rather than extending vertically upwardly from a bottom wall as in most conventional end dump bodies. The bottom dump or belly dump bodies also suffer the same drawback, since the side walls of those trailers normally extend upwardly and outwardly from a bottom wall rather than substantially vertically from a bottom wall. A further disadvantage of the conventional side dump and end dump trailers is that they are only able to haul a single commodity.

Applicant overcame the objections noted above to side dump trailers by way of the inventions disclosed in U.S. Pat. Nos. 5,967,615; 6,179,385; 7,360,813 and 7,478,883. Although the side dump bodies of the above-identified patents perform their intended functions in an exceptional manner, it has been found that some of the contents of the side dump bodies, after they have been moved to their dumped position, may sometimes be present in the dumped side body due to the pile of dumped material extending upwardly into the interior of the side dump body. If the truck or trailer is moved forwardly or rearwardly in that condition, the dumped material which is piled along the side of the truck or trailer may damage the side dump body since the side dump body is normally constructed of light-weight steel or other metal material.

In Applicant's earlier application, many of the problems of the prior art were overcome. However, in Applicant's co-pending application, the side dump body or tub could only be pivotally moved to a dumping position at one side of the truck or trailer.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A side dump body is disclosed which has substantially vertically disposed side walls, a bottom wall, a back wall and a front wall to increase the carrying capacity of the body as compared to those side dump bodies having upwardly and outwardly extending side walls. One or more of the side dump bodies or units may be mounted on a wheeled frame such as found on a truck or trailer. The first upstanding support is secured at its lower end to the wheeled frame adjacent the rearward end thereof. The upper left end of the first support has a first pivot pin receiving saddle thereon and the upper right end of the first support has a second pivot pin receiving saddle thereon. A second upstanding support is positioned immediately forwardly of the first support and has its lower end secured to the wheeled frame. The upper left end of the second support has a third pivot pin receiving saddle thereon and the upper right end of the second support has a fourth pivot pin receiving saddle thereon. The second support has a horizontally disposed first pivot pin secured thereto which extends rearwardly therefrom and which is selectively removably pivotally received by the first pivot pin receiving saddle. A first locking device is mounted on the first support which is movable between locked and unlocked positions to selectively lock the first pivot pin in the first pivot pin receiving saddle. The second support also has a horizontally disposed second pivot pin secured thereto which extends rearwardly therefrom and which is selectively removably pivotally received by the second pivot pin receiving saddle. A second locking device is mounted on the first support which is movable between locked and unlocked positions to selectively lock the second pivot pin and the second pivot pin receiving saddle. The upper left end of the second support has a third pivot pin receiving saddle thereon with the upper right end of the second support having a fourth pivot pin receiving saddle thereon.

A first hydraulic cylinder, having a rod end and a base end, is provided with the base end of the first hydraulic cylinder being pivotally secured to the first support below the first and second pin receiving saddles midway therebetween. The rod end of the first hydraulic cylinder is pivotally secured to the second support midway between the third and fourth pivot pin receiving saddles. A second hydraulic cylinder is also provided which has a rod end and a base end. The base end of the second hydraulic cylinder is pivotally secured to the second support adjacent the lower end thereof midway between the third and fourth pivot pin receiving saddles.

The invention also includes a third upstanding support which has its lower end secured to the forward end of the wheeled frame and has an upper left end and an upper right end as viewed from the forward end of the wheeled frame. The upper left end of the third support has a fifth pivot pin receiving saddle thereon with the upper right end of the third support having a sixth pivot pin receiving saddle thereon. A fourth upstanding support is also provided which has an upper left end and an upper right end as viewed from the forward end of the wheeled frame. The fourth support is closely positioned rearwardly of the third support. The upper left end of the fourth support has a seventh pivot pin receiving saddle thereon with the upper right end of the fourth support having an eighth pivot pin receiving saddle thereon. A third hydraulic cylinder is provided which has a rod end and a base end with the base end of the third hydraulic cylinder being pivotally secured to the third support below the fifth and sixth pivot pin receiving saddles midway therebetween. The rod end of the third hydraulic cylinder is pivotally secured to the fourth support midway between the seventh and eight pivot pin receiving saddles. A fourth hydraulic cylinder is also provided which has a rod end and a base end with the base end of the fourth hydraulic cylinder being pivotally secured to the fourth support adjacent the lower end thereof midway between the seventh and eighth pivot pin receiving saddle. A back wall of the side dump body has a pair of spaced-apart third and fourth pivot pins extending rearwardly therefrom with the third pivot pin being selectively removably pivotally received by the third pivot pin receiving saddle and the fourth pivot pin being selectively removably pivotally received by the fourth pivot pin receiving saddle. The fourth support has a horizontally disposed fifth pivot pin secured thereto below the upper left end thereof which extends rearwardly therefrom and which is selectively removably pivotally received by the fifth pivot pin receiving saddle. The fourth support also has a horizontally disposed sixth pivot pin secured thereto below the upper right end which extends rearwardly therefrom and which is selectively removably pivotally received by the sixth pivot pin receiving saddle. The front wall of the side dump body has horizontally spaced-apart seventh and eight pivot pins extending forwardly therefrom with the seventh pivot pin being selectively removably pivotally receiving by the seventh pin receiving saddle on the fourth support and with the eighth pivot pin being selectively removably pivotally received by the eighth pivot pin receiving saddle. A locking device is associated with each of the pivot pins and which is movable between locked and unlocked positions. When the locking device is in its locked position, the associated pivot pin is maintained in the associated or respective pivot pin receiving saddle.

The extension of the first and third hydraulic cylinders, when the side dump body is in its transport position and the first, third, sixth and eighth locking devices are in said unlocked position causes the side dump body to be pivotally moved to a first right side dumping position towards the right side of the wheeled frame. The extension of the second and fourth hydraulic cylinders, when the side dump body is in its first right side dumping position, causes the side dump body to be pivotally moved to its second right side dumping position at the right side of the wheeled frame. The retraction of the first and third hydraulic cylinders, when the side dump body is in its second right side dumping position, causes the side dump body to be moved to a complete right side dumping position wherein the side dump body is moved upwardly and inwardly from the second right side dumping position to clear the pile of material which may have been dumped from the right side of the side dump body. The retraction of the second and fourth hydraulic cylinders, when the side dump body is in its complete right side dumping position, causes the side dump body to be pivotally moved to its transport position.

The extension of the first and third hydraulic cylinders, when the side dump body is in its transport position, and the second, fourth, fifth and seventh locking devices are in their unlocked position, causes the side dump body to be pivotally moved to a first left side dumping position towards the left side of the wheeled frame. The extension of the second and fourth hydraulic cylinders, when the side dump body is in its first left side dumping position, causes the side dump body to be pivotally moved to a second left side dumping position at the left side of the wheeled frame. The retraction of the first and third hydraulic cylinders, when the side dump body is in its second left side dumping position, causes the side dump body to be moved to a complete left side dumping position wherein the side dump body is moved upwardly and inwardly from the second left side dumping position to clear the pile of material which may have been dumped from the left side of the wheeled frame. The retraction of the second and fourth hydraulic cylinders, when the side dump body is in its complete left side dumping position, causes the side dump body to be pivotally moved to its transport position.

It is therefore a principal object of the invention to provide an improved side dump body for use on a truck or trailer.

Still another object of the invention is to provide a side dump body having an increased carrying capacity when compared to conventional side dump bodies.

Yet another object of the invention is to provide a side dump body which is stable during use.

Still another object of the invention is to provide a side dump truck or trailer wherein one or more side dump bodies are individually selectively pivotally secured to the frame means of the truck or trailer.

Yet another object of the invention is to provide a side dump truck or trailer wherein the side dump body thereof may be dumped to either side of the truck or trailer.

Yet another object of the invention is to provide a side dump trailer which may be moved upwardly or inwardly with respect to the pile of material which has been dumped by the side dump body so that the side dump body will not engage the pile, thereby preventing damage to the side dump body if the truck or trailer is moved forwardly or rearwardly after the contents have been dumped therefrom.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 3 is a side view of the side dump body of this invention with the side dump body being in its first right side dumping position;

FIG. 4 is a rear view similar to FIG. 3 except that the side dump body has been pivotally moved to a second right side dumping position;

DESCRIPTION OF THE PREFERRED EMBODIMENT

Figure 1:
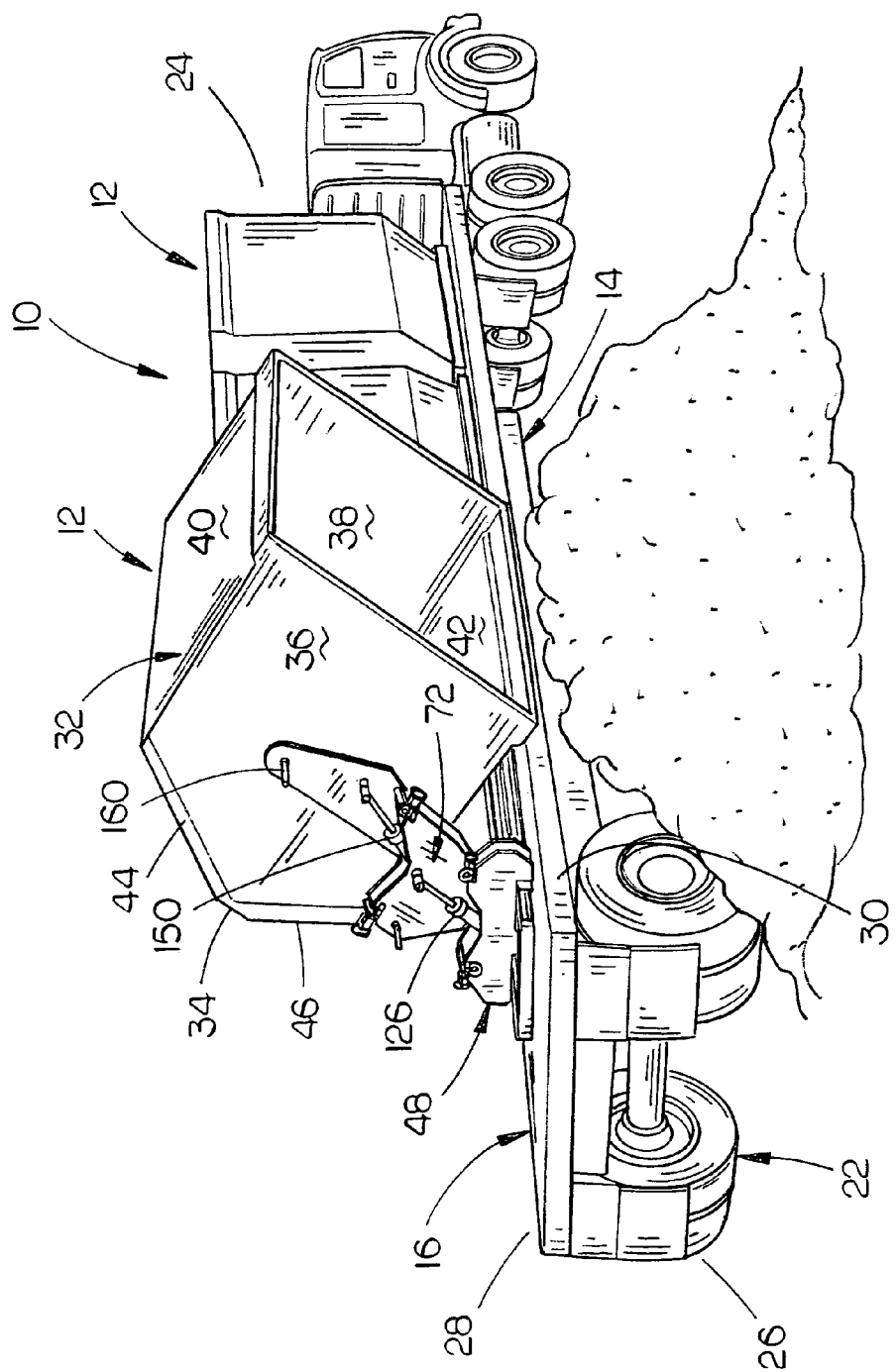
FIG. 1 is a rear perspective view of the side dump body of this invention with one of the side dump bodies being in its second right side dumping position.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The side dump body of this invention is referred to generally by the reference numeral 10 and comprises one or more side dump bodies or units 12 mounted on a frame means 14 which may be incorporated into a trailer or into what is commonly called a straight truck. While the drawings illustrate a side dump body 10 mounted on a trailer 16, the side dump body can also be mounted on a truck as described.

Frame means 14 normally comprises a pair of longitudinally extending frame members 18 and 20 which are conventionally supported on a running gear 22. For purposes of description, the frame means 14 will be described as including a forward end 24, rearward end 26, and opposite sides 28 and 30. Inasmuch as each of the side dump bodies or units 12 are identical, only a single side dump body 12 will be described. Side dump body 12 includes a tub 32 including a bottom wall 24, rear wall 36, front wall 38 and side walls 40 and 42. As seen, the side walls 40 and 42 extend vertically upwardly from the bottom 34. A short tapered wall portion 44 is provided between the bottom wall 34 and side wall 40 and a short tapered wall portion 46 is provided between bottom wall 34 and side wall 42, as seen in the drawings, for a purpose to be described hereinafter.

The numeral 48 refers to a first upstanding support, the lower end of which is secured to the frame means 14 at the rearward end thereof by any convenient means such as by welding or bolts. As seen, support 48 includes a pair of vertically disposed and horizontally spaced-apart support members 50 and 52. As viewed from the rearward end of the trailer, support means 48 will be described as having an upper left end 54, an upper right end 56 and a lower end 58. A longitudinally extending first pivot pin receiving saddle 60 is provided at the upper left end 54 of support 48. A first locking device 62 is secured to support 48 which is movable between locked and unlocked positions.

A longitudinally extending second pivot pin receiving saddle 64 is provided at the upper right end 56 of support 48. A second locking device 66 is secured to support 48 which is movable between locked and unlocked positions. A first hydraulic cylinder 68 is positioned between support members 50 and 52 and has its base end pivotally secured to support 48 at 70.

The numeral 72 refers to a second upstanding support which is positioned closely adjacent the forward side of first support 48. As viewed from the rearward end of the trailer, support 72 will be described as having an upper left end 74, an upper right end 76, and a lower end 78. As seen, support 72 includes a pair of vertically disposed and horizontally spaced support members 80 and 82. A longitudinally extending third pivot pin receiving saddle 84 is provided at the upper left end of support 72. A longitudinally extending fourth pivot pin receiving saddle 86 is provided at the upper right end of support 72.

A second hydraulic cylinder 88 is positioned between support members 80 and 82 and has its base end pivotally secured to support 72 at 90. The rod end of cylinder 88 is pivotally secured to back wall 36 at 92. Support 72 has a first pivot pin 94 extending horizontally rearwardly therefrom below the upper left end 74 and has a second pivot pin 96 extending horizontally rearwardly therefrom below upper right end 76.

Pivot pins 94 and 96 selectively removably pivotally are received by saddles 60 and 64 respectively. Locking devices 62 and 66 are provided to lock pins 94 and 96 in saddles 60 and 64 respectively when in their locked positions. The rod end of hydraulic cylinder 68 is pivotally connected to pin 97 which extends rearwardly from support 72.

Back wall 36 has third and fourth pivot pins 98 and 100 respectively which extend horizontally rearwardly therefrom which are adapted to be removably pivotally received by saddles 84 and 86 respectively. A third locking device 102 is associated with saddle 84 to selectively lock pivot pin 98 therein when in its locked position. A fourth locking device 104 is associated with saddle 86 to selectively lock pivot pin 100 therein when in its locked position. The first, second, third and fourth locking devices are identical.

The numeral 106 refers to a third upstanding support, the lower end of which is secured to the frame means 14 at the forward end thereof. As seen, support 106 includes a pair of vertically disposed and horizontally spaced-apart support members 108 and 110. As viewed from the forward end of the trailer, support 106 will be described as having an upper left end 112, an upper right end 114, and a lower end 116. A longitudinally extending fifth pivot pin receiving saddle 118 is provided at the upper left end 112 of support 106. A fifth locking device 120, which is identical to locking devices 62, 66, 102 and 104, is secured to support 72 and which is movable between locked and unlocked positions. A longitudinally extending sixth pivot pin receiving saddle 122 is provided at the upper right end 114 of support 106. A sixth locking device 124, which is identical to the locking devices described above, is mounted on the third support 106 and is associated with the sixth pivot pin receiving saddle 122 and which is movable between locked and unlocked positions. A third hydraulic cylinder 126 is positioned between support members 108 and 110 of support 106 and has its base end pivotally secured to support 72 at 128.

The numeral 130 refers to a fourth upstanding support which is closely positioned adjacent the rearward side of third support 106. As viewed from the forward end of the trailer, support 130 will be described as having an upper left end 132, an upper right end 134 and a lower end 136. As seen, fourth support 130 is comprised of a pair of vertically disposed and horizontally spaced support members 138 and 140. A longitudinally extending seventh pivot pin receiving saddle 142 is provided at the upper left end 132 of support 130. A seventh locking device 144, which is identical to the locking devices described above, is secured to support 130 adjacent saddle 142 and is movable between locked and unlocked positions. A longitudinally extending eighth pivot pin receiving saddle 146 is provided on the upper right end 134 of support 130. An eighth locking device 148, which is identical to the other locking devices described hereinabove, is provided on the support 130 adjacent saddle 146 which is movable between locked and unlocked positions. A fourth hydraulic cylinder 150 is positioned between support members 138 and 140 of support 130 and has its base end pivotally secured to support 130 at 152 and has its rod end pivotally secured to front wall 38 at 154. The rod end of hydraulic cylinder 126 is pivotally connected to pin 155 which extends forwardly from support 130.

Support 130 has a fifth pivot pin 156 secured thereto which extends forwardly therefrom below upper left end 132 and has a sixth pivot pin 158 secured thereto which extends forwardly therefrom below upper right end 134. Pivot pins 156 and 158 are adapted to be received by the saddles 118 and 122 respectively. Front wall 38 has seventh and eighth pivot pins 160 and 162 secured thereto which extend forwardly therefrom which are adapted to be received by the saddles 142 and 146 respectively.

When the locking devices are in their locked positions, the pivot pins associated therewith are locked in the respective pivot pin receiving saddles.

Figure 2:
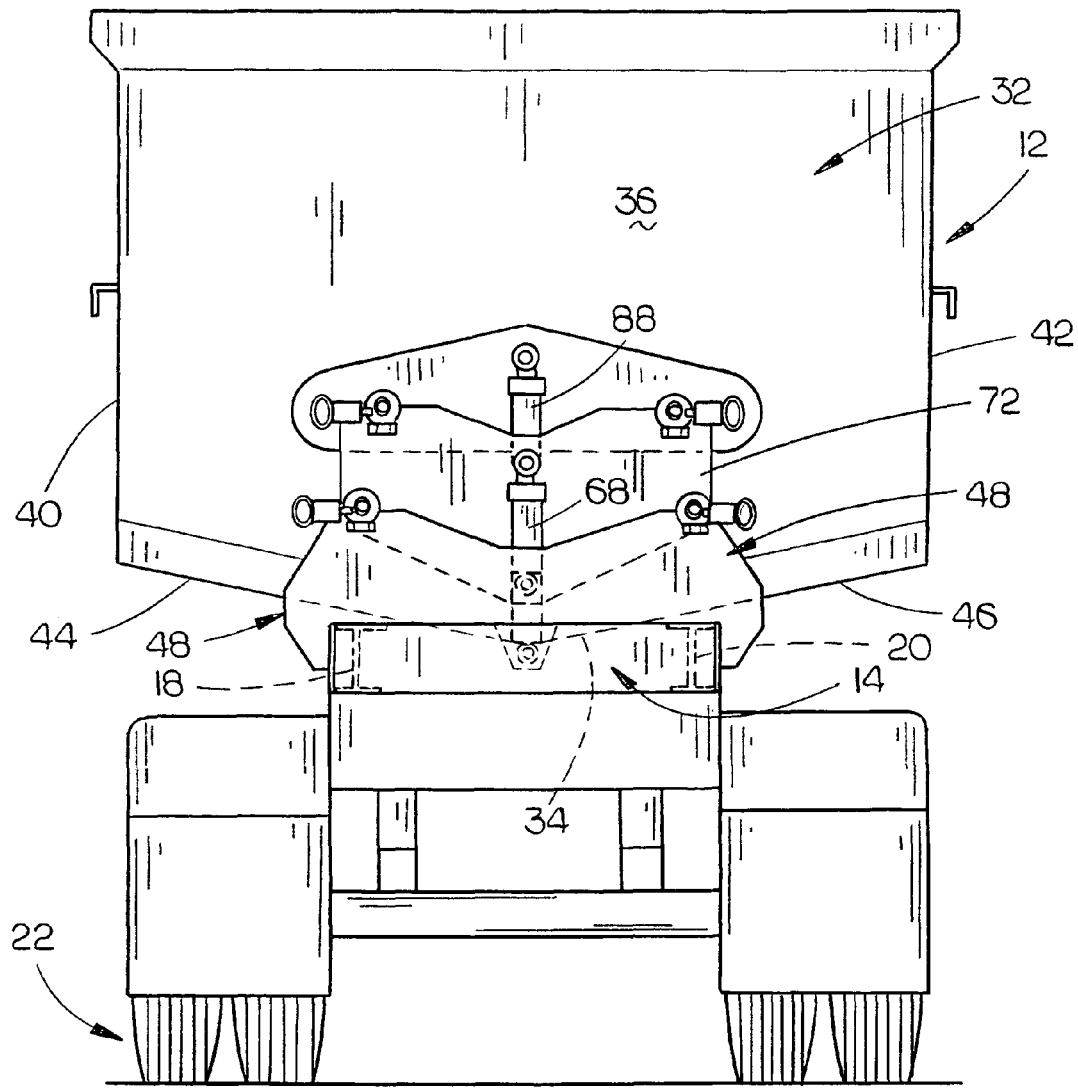
FIG. 2 is rear view of the side dump body of this invention in its transport position.
Figure 5:
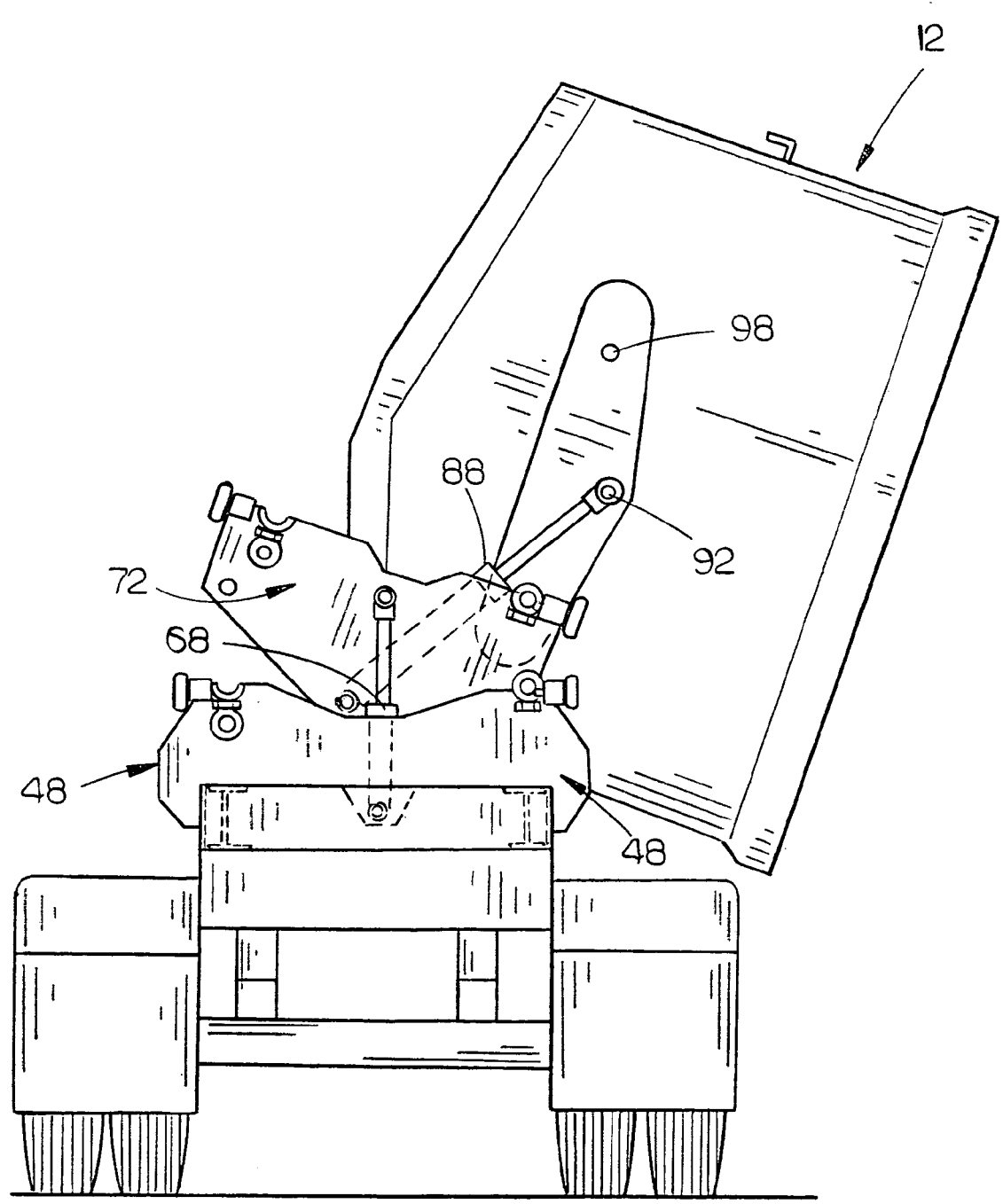
FIG. 5 is a view similar to FIGS. 3 and 4 except that the side dump body has been moved to its complete right side dumping position.
Figure 6:
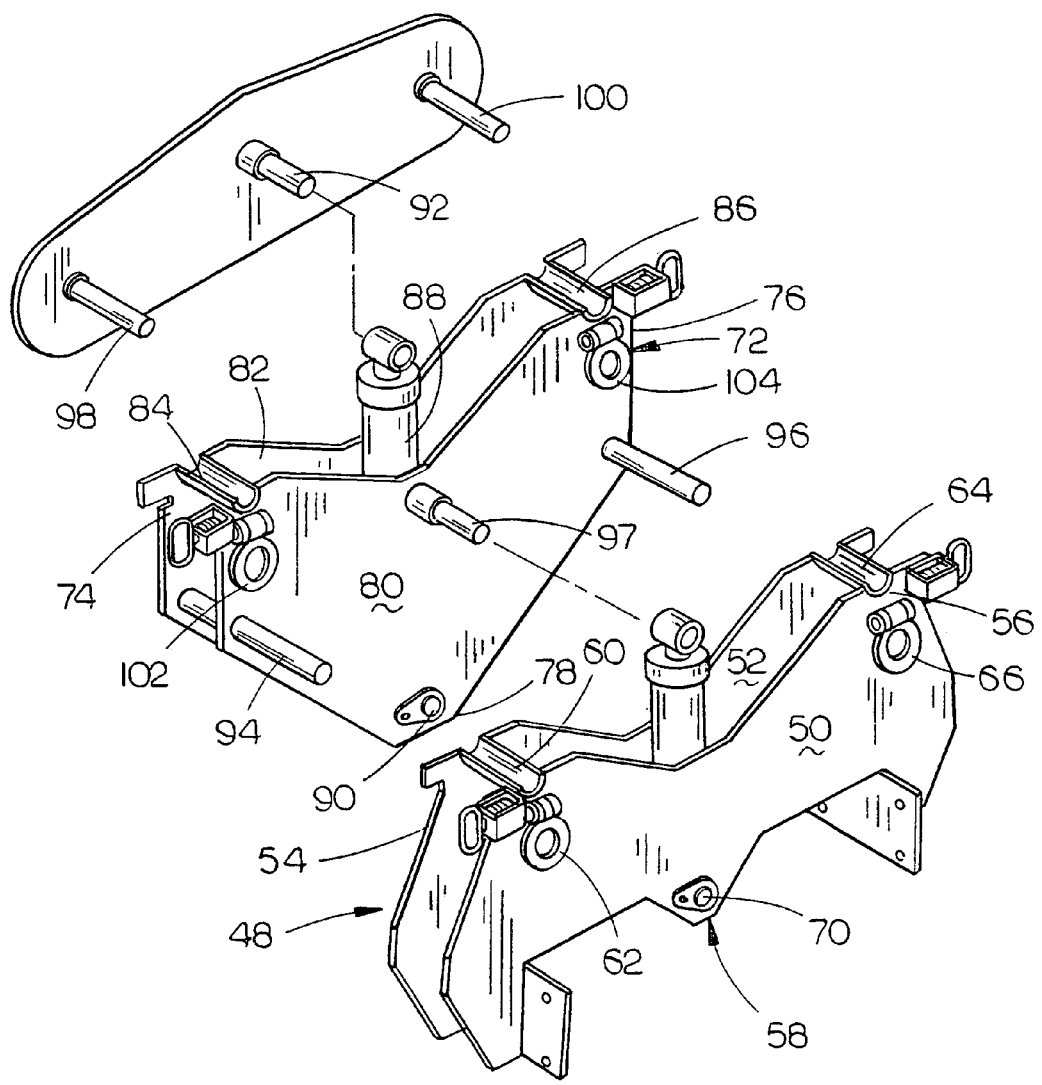
FIG. 6 is a perspective view of the mechanism for pivotally moving the side dump body with respect to the wheeled frame.
Figure 7:
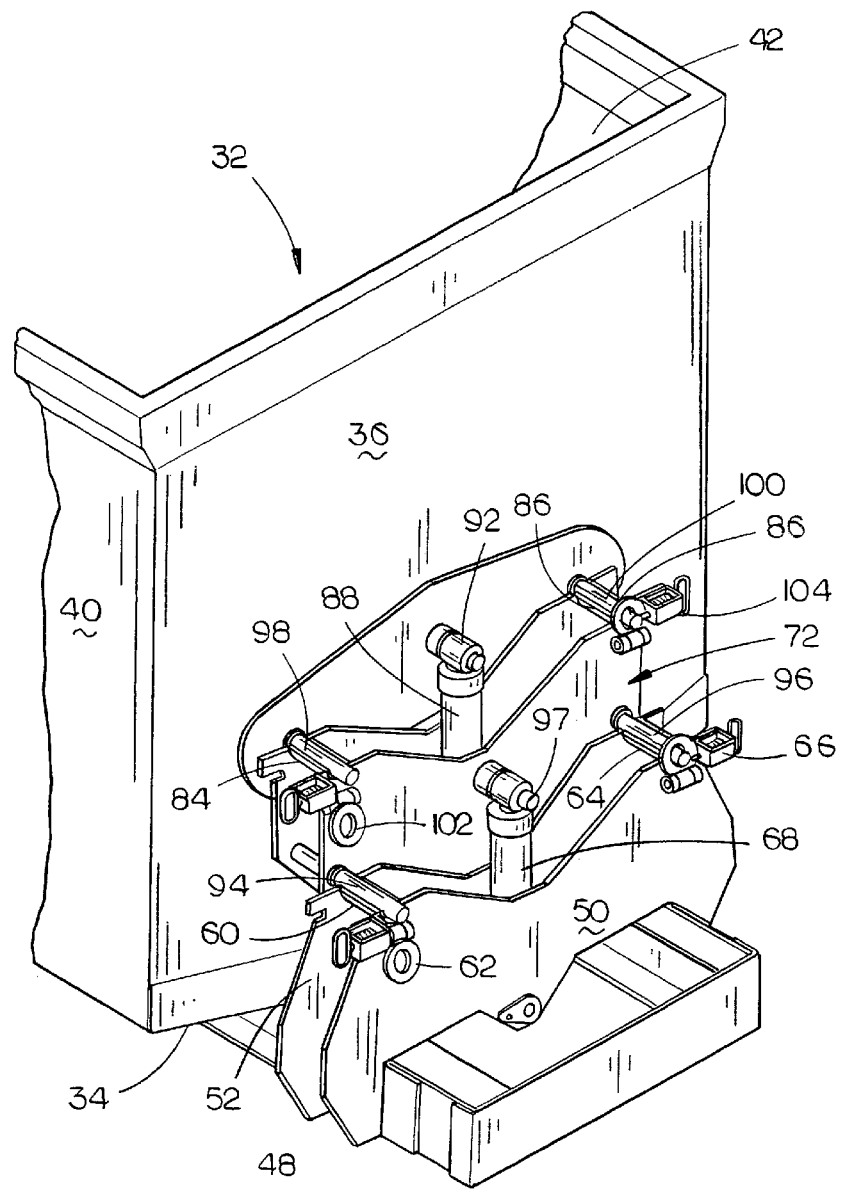
FIG. 7 is a rear perspective view of the mechanism of FIG. 6 positioned at the rear of the tub and the wheeled frame.
Figure 8:
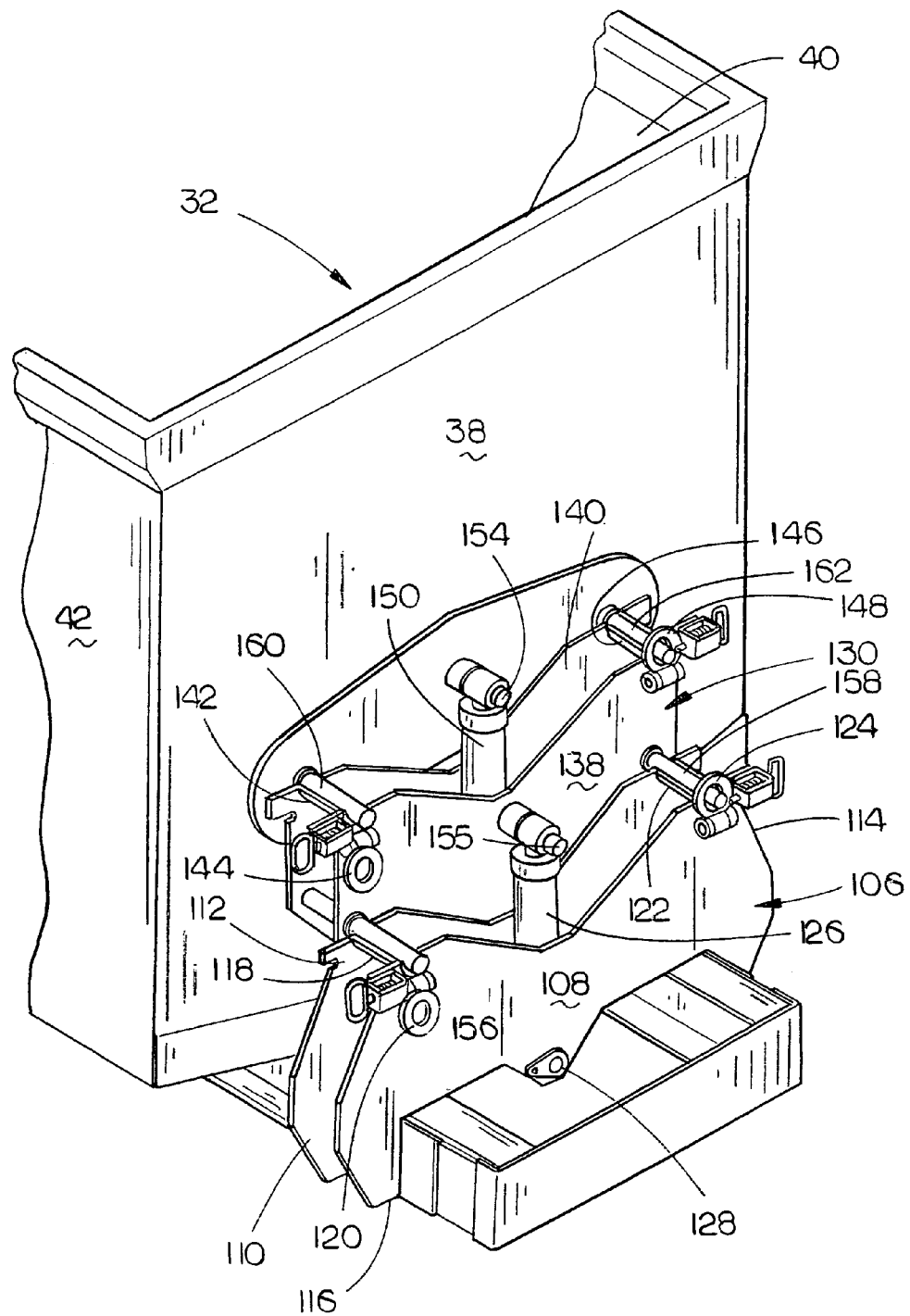
FIG. 8 is a front perspective view of the mechanism of FIG. 6 positioned at the front wall of the tub and at the forward end of the wheeled frame.
Figure 9:
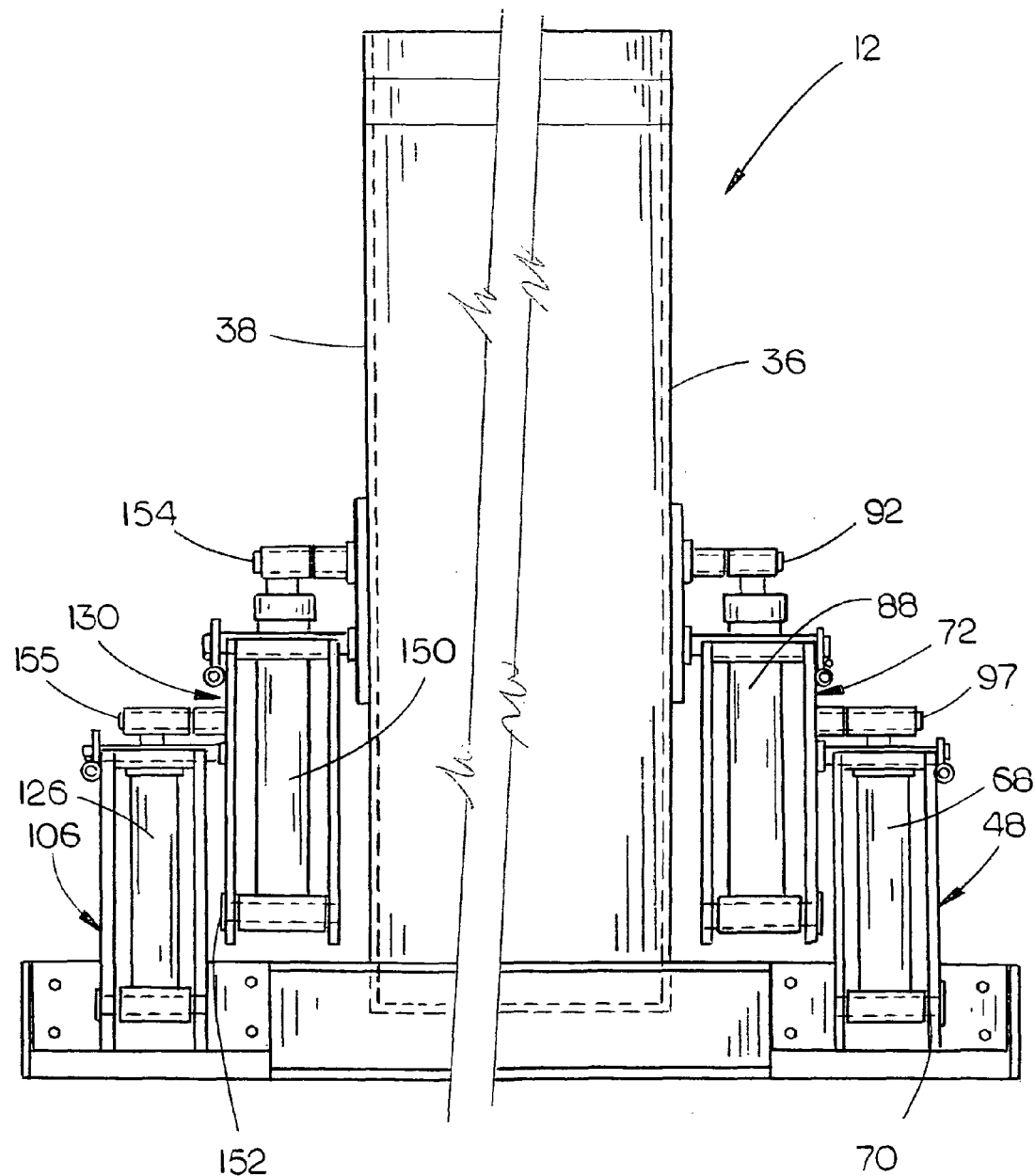
FIG. 9 is a partial side elevational view illustrating the mechanisms at the front and rear of the tub for pivotally moving the same.

When it is desired to dump the material from the tub 32 to the right side of the vehicle as viewed from the rear of the vehicle, locking devices 62, 102, 124 and 148 are moved to the unlocked position with locking devices 66, 104, 120 and 144 being left in their locked position. Hydraulic cylinders 68 and 126 are then extended so that the tub 32 is pivotally moved from its transport position of FIG. 2 to the right side of the first dumping position of FIG. 3. The hydraulic cylinders 88 and 150 are then extended to pivotally move the tub 32 to the right side of the second dumping position of FIG. 4. If the materials which are dumped from the tub are still in engagement with a portion of the tub 32, the hydraulic cylinders 68 and 126 are then retracted to the position of FIG. 5 so that the tub 32 moves upwardly and inwardly from the position of FIG. 4 to the position of FIG. 5. The tub 32 may then be moved to its transport position by retracting hydraulic cylinders 88 and 150.

Figure 10:
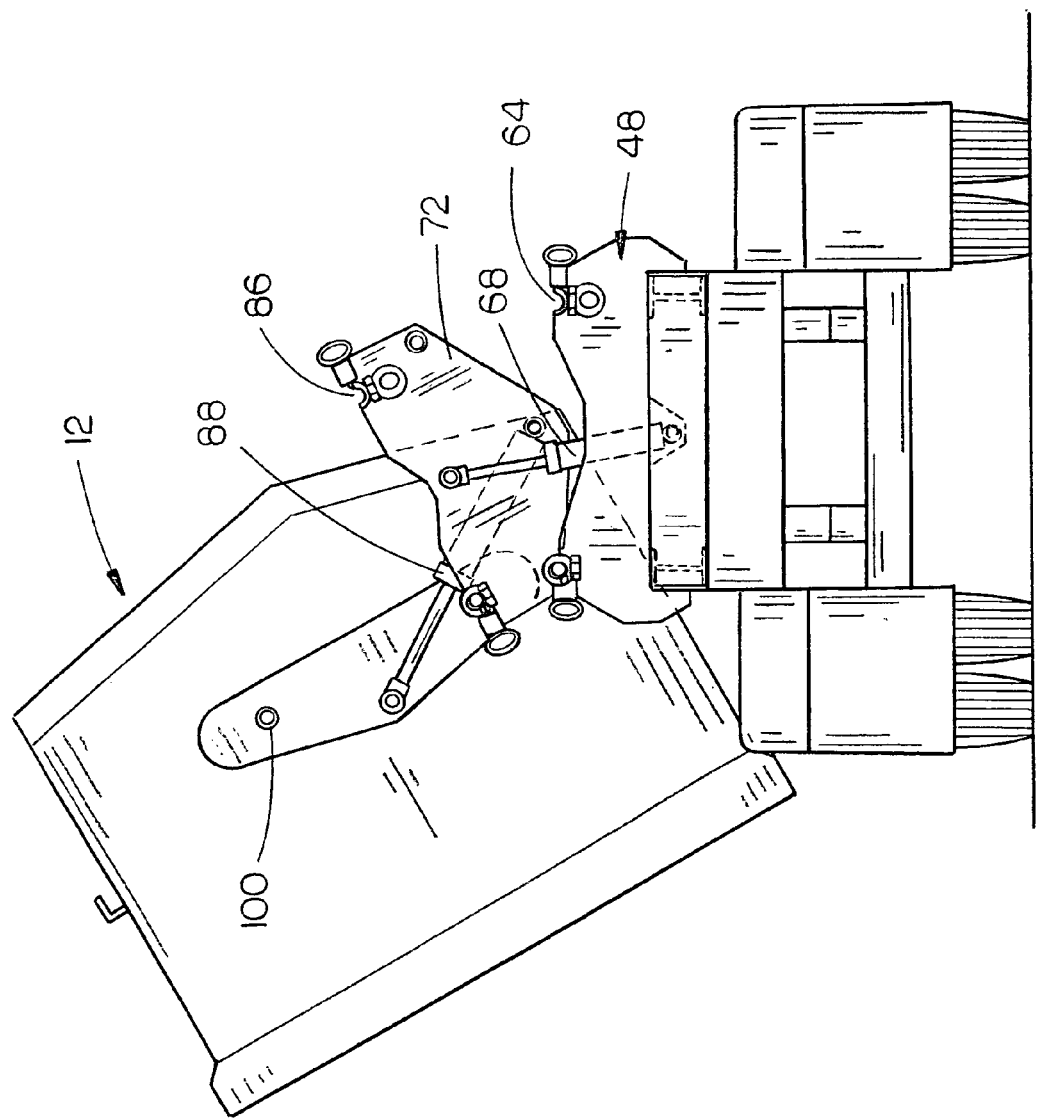
FIG. 10 is a rear view illustrating the side dump body being pivotally moved to its left side dumping position.

If it is desired to dump the material from the tub 32 to the left side of the vehicle as viewed from the rear of the vehicle, locking devices 66, 104, 120 and 144 will be unlocked with locking devices 62, 102, 124 and 148 being locked. Hydraulic cylinders 68 and 126 are then extended so that the tub 32 is pivotally moved from its transport position to a left side first dumping position. The hydraulic cylinders 88 and 150 are then extended to pivotally move the tub 32 to a right side second dumping position of FIG. 10. If the materials which have been dumped from the tub 32 are still in engagement with a portion of the tub 32, the hydraulic cylinders 68 and 126 are then retracted to move the tub 32 upwardly and inwardly with respect to the pile of material. Tub 32 may then be moved to its transport position by retracting hydraulic cylinders 88 and 150.

Thus it can be seen that a novel side dump body has been provided which has an increased carrying capacity and which may be dumped from either side of the vehicle. It can also be seen that a novel means has been provided which enables the tub to be moved upwardly and inwardly away from the pile of material dumped therefrom so that the tub will not be damaged should the vehicle move forwardly or rearwardly with respect to the pile of material.

It can therefore be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. In combination:
a wheeled frame having a rearward end, a forward end, a left side and a right side as viewed from the rearward end of said wheeled frame;
a first upstanding support means having a forward side, a rearward side, a lower end, an upper left end and an upper right end, as viewed from the rearward end of said wheeled frame;
said first support means being secured at its said lower end to said wheeled frame adjacent said rearward end thereof and extending upwardly therefrom;
said upper left end of said first support means having a first pivot pin receiving saddle thereon;
said upper right end of said first support means having a second pivot pin receiving saddle thereon;
a second upstanding support means having a forward side, a rearward side, a lower end, an upper left end and an upper right end, as viewed from the rearward end of said wheeled frame;
said second support means being closely positioned forwardly of said first support means;
said upper left end of said second support means having a third pivot pin receiving saddle thereon;
said upper right end of said second support means having a fourth pivot pin receiving saddle thereon;
said second support means having a horizontally disposed first pivot pin secured thereto below said upper left end thereof which extends rearwardly therefrom and which is selectively removably pivotally received by said first pivot pin receiving saddle;
a first locking device on said first support means which is movable between locked and unlocked positions to selectively lock said first pivot pin in said first pivot pin receiving saddle;
said second support means having a horizontally disposed second pivot pin secured thereto below said upper right end thereof which extends rearwardly therefrom and which is selectively removably pivotally received by said second pivot pin receiving saddle;
a second locking device on said first support means which is movable between locked and unlocked positions to selectively lock said second pivot pin in said second pivot pin receiving saddle;
a first hydraulic cylinder having a rod end and a base end;
said base end of said first hydraulic cylinder being pivotally secured to said first support means below said first and second pivot pin receiving saddles midway therebetween;
said rod end of said first hydraulic cylinder being pivotally secured to said second support means midway between said third and fourth pivot pin receiving saddles;
a second hydraulic cylinder having a rod end and a base end;
said base end of said second hydraulic cylinder being pivotally secured to said second support means adjacent said lower end thereof midway between said third and fourth pivot pin receiving saddles;
a third upstanding support means having a forward side, a rearward side, a lower end, an upper left end and an upper right end as viewed from the forward end of said wheeled frame;
said third support means being secured at its said lower end to said wheeled frame adjacent said forward end thereof and extending upwardly therefrom;
said upper left end of said third support means having a fifth pivot pin receiving saddle thereon;
said upper right end of said third support means having a sixth pivot pin receiving saddle thereon;
a fourth upstanding support means having a forward side, a rearward side, a lower end, an upper left end and an upper right end as viewed from the forward end of said wheeled frame;
said fourth support means being closely positioned rearwardly of said third support means;

said upper left end of said fourth support means having a seventh pivot pin receiving saddle thereon;
said upper right end of said fourth support means having an eighth pivot pin receiving saddle thereon;
a third hydraulic cylinder having a rod end and a base end;
said base end of said third hydraulic cylinder being pivotally secured to said third support means below said fifth and sixth pivot pin receiving saddles midway therebetween;
said rod end of said third hydraulic cylinder being pivotally secured to said fourth support means midway between said seventh and eighth pivot pin receiving saddles;
a fourth hydraulic cylinder having a rod end and a base end;
said base end of said fourth hydraulic cylinder being pivotally secured to said fourth support means adjacent said lower end thereof midway between said seventh and eighth pivot pin receiving saddles;
a dump body positioned between said second and fourth support means and being movable from a transport position to a first dumping stage and a second dumping stage to either said left side of said wheeled frame or to said right side of said wheeled frame;
said dump body including a back wall, a front wall, a bottom wall, and first and second substantially vertically disposed side walls;
said back wall of said side dump body having horizontally spaced-apart third and fourth pivot pins extending rearwardly therefrom;
said third pivot pin being selectively removably pivotally received by said third pivot pin receiving saddle;
a third locking device on said second support means which is movable between locked and unlocked positions to selectively lock said third pivot pin in said third pivot pin receiving saddle;
said fourth pivot pin being selectively removably pivotally received by said fourth pivot pin receiving saddle;
a fourth locking device on said second support means which is movable between locked and unlocked positions to selectively lock said fourth pivot pin in said fourth pivot pin receiving saddle;
said fourth support means having a horizontally disposed fifth pivot pin secured thereto below said upper left end thereof which extends rearwardly therefrom and which is selectively removably pivotally received by said fifth pivot pin receiving saddle;
said fourth support means having a horizontally disposed sixth pivot pin secured thereto below said upper right end which extends rearwardly therefrom and which is selectively removably pivotally received by said sixth pivot pin receiving saddle;
a fifth locking device on said third support means which is movable between locked and unlocked positions to selectively lock said fifth pivot pin in said fifth pivot pin receiving saddle;
a sixth locking device on said third support means which is movable between locked and unlocked positions to selectively lock said sixth pivot pin in said sixth pivot pin receiving saddle;
said front wall of said side dump body having horizontally spaced-apart seventh and eighth pivot pins extending forwardly therefrom;
said seventh pivot pin being selectively removably pivotally received by said seventh pivot pin receiving saddle on said fourth support means;
said eighth pivot pin being selectively removably pivotally received by said eighth pivot pin receiving saddle;
a seventh locking device on said fourth support means which is movable between locked and unlocked positions to selectively lock said seventh pivot pin in said seventh pivot pin receiving saddle;
an eighth locking device on said fourth support means which is movable between locked and unlocked positions to selectively lock said eighth pivot pin in said eighth pivot pin receiving saddle;
said first, second, third and fourth hydraulic cylinders being movable between retracted and extended positions;
said dump body being in its said transport position when said first, second, third and fourth hydraulic cylinders are in their said retracted positions;
the extension of said first and third hydraulic cylinders, when said side dump body is in said transport position and said first, third, sixth and eighth locking devices are in said unlocked position causing said side dump body to be pivotally moved to a first right side dumping position towards the right side of the wheeled frame;
the extension of said second and fourth hydraulic cylinders, when said side dump body is in said first right side dumping position, causing said side dump body to be pivotally moved to a second right side dumping position at the right side of the wheeled frame;
the retraction of said first, second, third and fourth hydraulic cylinders, when said side dump body is in said second right side dumping position, causing said side dump body to be pivotally moved to said transport position;
the extension of said first and third hydraulic cylinders, when said side dump body is in said transport position and said second, fourth, fifth and seventh locking devices are in said unlocked position causing said side dump body to be pivotally moved to a first left side dumping position towards the left side of the wheeled frame;
the extension of said second and fourth hydraulic cylinders, when said side dump body is in said first left side dumping position, causing said side dump body to be pivotally moved to a second left side dumping position at the left side of the wheeled frame;
the retraction of said first, second, third and fourth hydraulic cylinders, when said side dump body is in said second left side dumping position, causing said side dump body to be pivotally moved to said transport position.

2. The combination of claim 1 wherein said first support means includes first and second vertically disposed and horizontally spaced-apart support members, said second support means including first and second vertically disposed and horizontally spaced-apart support members, said third support means including first and second vertically disposed and horizontally spaced-apart support members, said fourth support means including first and second vertically disposed and horizontally spaced-apart support members, said first hydraulic cylinder being positioned between the first and second support members of said first support means, said second hydraulic cylinder being positioned between said first and second support members of said second support means, said third hydraulic cylinder being positioned between said first and second support members of said third support means, said fourth hydraulic cylinder being positioned between said first and second support members of said fourth support means.

3. In combination:
a wheeled frame having a rearward end, a forward end, a left side and a right side as viewed from the rearward end of said wheeled frame;

a first upstanding support means having a forward side, a rearward side, a lower end, an upper left end and an upper right end, as viewed from the rearward end of said wheeled frame;

said first support means being secured at its said lower end to said wheeled frame at said rearward end thereof and extending upwardly therefrom;

said upper left end of said first support means having a first pivot pin receiving saddle thereon;

said upper right end of said first support means having a second pivot pin receiving saddle thereon;

a second upstanding support means having a forward side, a rearward side, a lower end, an upper left end and an upper right end, as viewed from the rearward end of said wheeled frame;

said second support means being closely positioned forwardly of said first support means;

said upper left end of said second support means having a third pivot pin receiving saddle thereon;

said upper right end of said second support means having a fourth pivot pin receiving saddle thereon;

said second support means having a horizontally disposed first pivot pin secured thereto below said upper left end thereof which extends rearwardly therefrom and which is selectively removably pivotally received by said first pivot pin receiving saddle;

a first locking device on said first support means which is movable between locked and unlocked positions to selectively lock said first pivot pin in said first pivot pin receiving saddle;

said second support means having a horizontally disposed second pivot pin secured thereto below said upper right end thereof which extends rearwardly therefrom and which is selectively removably pivotally received by said second pivot pin receiving saddle;

a second locking device on said first support means which is movable between locked and unlocked positions to selectively lock said second pivot pin in said second pivot pin receiving saddle;

a first hydraulic cylinder having a rod end and a base end;

said base end of said first hydraulic cylinder being pivotally secured to said first support means below said first and second pivot pin receiving saddles midway therebetween;

said rod end of said first hydraulic cylinder being pivotally secured to said second support means midway between said third and fourth pivot pin receiving saddles;

a second hydraulic cylinder having a rod end and a base end;

said base end of said second hydraulic cylinder being pivotally secured to said second support means adjacent said lower end thereof midway between said third and fourth pivot pin receiving saddles;

a third upstanding support means having a forward side, a rearward side, a lower end, an upper left end and an upper right end as viewed from the forward end of said wheeled frame;

said third support means being secured at its said lower end to said wheeled frame adjacent said forward end thereof and extending upwardly therefrom;

said upper left end of said third support means having a fifth pivot pin receiving saddle thereon;

said upper right end of said third support means having a sixth pivot pin receiving saddle thereon;

a fourth upstanding support means having a forward side, a rearward side, a lower end, an upper left end and an upper right end as viewed from the forward end of said wheeled frame;

said fourth support means being closely positioned rearwardly of said third support means;

said upper left end of said fourth support means having a seventh pivot pin receiving saddle thereon;

said upper right end of said fourth support means having an eighth pivot pin receiving saddle thereon;

a third hydraulic cylinder having a rod end and a base end;

said base end of said third hydraulic cylinder being pivotally secured to said third support means below said fifth and sixth pivot pin receiving saddles midway therebetween;

said rod end of said third hydraulic cylinder being pivotally secured to said fourth support means midway between said seventh and eighth pivot pin receiving saddles;

a fourth hydraulic cylinder having a rod end and a base end;

said base end of said fourth hydraulic cylinder being pivotally secured to said fourth support means adjacent said lower end thereof midway between said seventh and eighth pivot pin receiving saddles;

a side dump body positioned between said second and fourth support means and being movable from a transport position to a first dumping stage, a second dumping stage and a complete dumping stage to either said left side of said wheeled frame or to said right side of said wheeled frame;

said dump body including a back wall, a front wall, a bottom wall, and first and second side walls;

said back wall of said side dump body having horizontally spaced-apart third and fourth pivot pins extending rearwardly therefrom;

said third pivot pin being selectively removably pivotally received by said third pivot pin receiving saddle;

said fourth pivot pin being selectively removably pivotally received by said fourth pivot pin receiving saddle;

a third locking device on said second support means which is movable between locked and unlocked positions to selectively lock said third pivot pin in said third pivot pin receiving saddle;

a fourth locking device on said second support means which is movable between locked and unlocked positions to selectively lock said fourth pivot pin in said fourth pivot pin receiving saddle;

said fourth support means having a horizontally disposed fifth pivot pin secured thereto below said upper left end thereof which extends rearwardly therefrom and which is selectively removably pivotally received by said fifth pivot pin receiving saddle;

said fourth support means having a horizontally disposed sixth pivot pin secured thereto below said upper right end which extends rearwardly therefrom and which is selectively removably pivotally received by said sixth pivot pin receiving saddle;

a fifth locking device on said third support means which is movable between locked and unlocked positions to selectively lock said fifth pivot pin in said fifth pivot pin receiving saddle;

a sixth locking device on said third support means which is movable between locked and unlocked positions to selectively lock said sixth pivot pin in said sixth pivot pin receiving saddle;

said front wall of said side dump body having horizontally spaced-apart seventh and eighth pivot pins extending forwardly therefrom;

said seventh pivot pin being selectively removably pivotally received by said seventh pivot pin receiving saddle on said fourth support means;
said eighth pivot pin being selectively removably pivotally received by said eighth pivot pin receiving saddle;
a seventh locking device on said fourth support means which is movable between locked and unlocked positions to selectively lock said seventh pivot pin in said seventh pivot pin receiving saddle;
an eighth locking device on said fourth support means which is movable between locked and unlocked positions to selectively lock said eighth pivot pin in said eighth pivot pin receiving saddle;
said first, second, third and fourth hydraulic cylinders being movable between retracted and extended positions;
said dump body being in its said transport position when said first, second, third and fourth hydraulic cylinders are in their said retracted positions;
the extension of said first and third hydraulic cylinders, when said side dump body is in said transport position and said first, third, sixth and eighth locking devices are in said unlocked position causing said side dump body to be pivotally moved to a first right side dumping position towards the right side of the wheeled frame;
the extension of said second and fourth hydraulic cylinders, when said side dump body is in said first right side dumping position, causing said side dump body to be pivotally moved to a second right side dumping position at the right side of the wheeled frame;
the retraction of said first and third hydraulic cylinders, when said side dump body is in said second right side dumping position, causing said side dump body to be moved to a complete right side dumping position wherein said side dump body is moved upwardly and inwardly from said second right side dumping position;
the retraction of said second and fourth hydraulic cylinders, when said side dump body is in said complete right side dumping position, causing said side dump body to be pivotally moved to said transport position;
the extension of said first and third hydraulic cylinders, when said side dump body is in said transport position and said second, fourth, fifth and seventh locking devices are in said unlocked position causing said side dump body to be pivotally moved to a first left side dumping position towards the left side of the wheeled frame;
the extension of said second and fourth hydraulic cylinders, when said side dump body is in said first left side dumping position, causing said side dump body to be pivotally moved to a second left side dumping position at the left side of the wheeled frame;
the retraction of said first and third hydraulic cylinders, when said side dump body is in said second left side dumping position, causing said side dump body to be moved to a complete left side dumping position wherein said side dump body is moved upwardly and inwardly from said second left side dumping position;
the retraction of said second and fourth hydraulic cylinders, when said side dump body is in said complete left side dumping position, causing said side dump body to be pivotally moved to said transport position.

4. The combination of claim 1 wherein a plurality of dump bodies are mounted on said wheeled frame.

* * * * *